United States Patent Office 3,512,868
Patented May 19, 1970

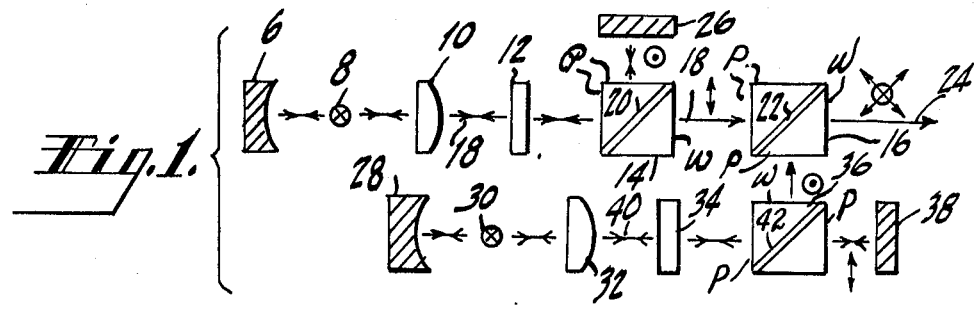
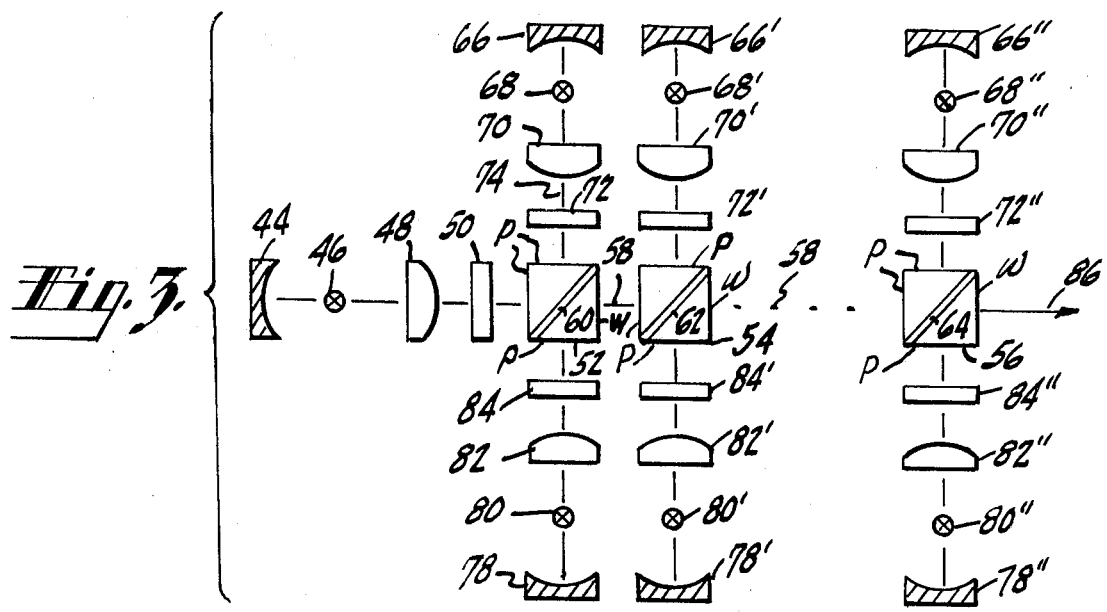
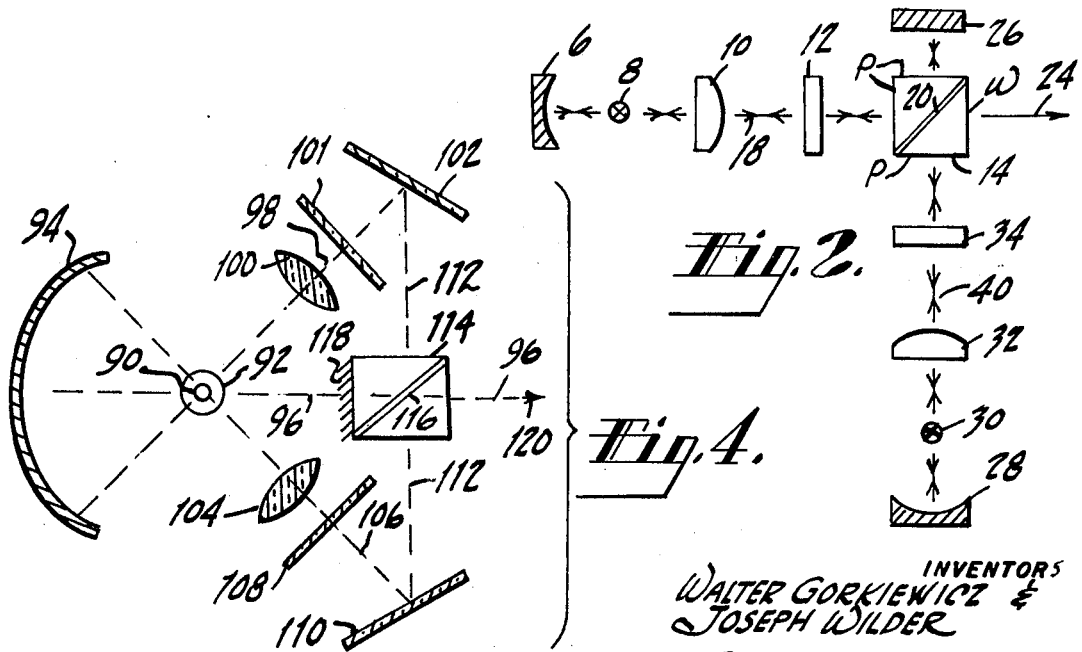

3,512,868
APPARATUS FOR FORMING A BEAM OF LIGHT
Walter Gorkiewicz, New York, N.Y., and Joseph Wilder, Princeton, N.J., assignors to RCA Corporation, a corporation of Delaware
Filed Dec. 29, 1967, Ser. No. 694,440
Int. Cl. G02b 5/30, 27/28
U.S. Cl. 350—157        4 Claims

ABSTRACT OF THE DISCLOSURE

Two beams of light having respective orthogonally related planes of polarization are directed to a polarizing beam splitter from such directions that one beam passes through the beam splitter in a given direction and the other beam is reflected by the beam splitter in said given direction, thereby combining the two beams into a single unpolarized beam. In one embodiment, each beam of polarized light is formed from a source of unpolarized light by placing a light retarder between the source and a polarizing beam splitter and by returning light of one polarization emerging along one output path of the beam splitter back along that path. In another embodiment, a single polarizing beam splitter is used for forming both beams of polarized light and for combining them into a single unpolarized beam.

This invention relates to optical apparatus forming a beam of unpolarized light with light derived from a plurality of sources or from different aspects of the same source.

It is an object of this invention to provide means for producing a beam of unpolarized light of a given brightness in such manner as to permit greater design flexibility with respect to cost, life, input power and distribution of light within the beam.

This object can be attained in accordance with this invention by forming with a mirror system separate beams from one or more sources and combining them into a single beam with the aid of polarizing beam splitters and light retarders. The polarizing beam splitter permits vertically polarized components of a first light beam to pass through it along a given path to form part of a desired output beam and reflects horizontally polarized components of a second light beam along the same path so that they form another component of the desired output beam. The horizontally polarized components of the first beam and the vertically polarized components of the second beam that do not initially pass along the path of the output beam are reflected back to the polarizing beam splitter and thence through a light retarder to the mirror system of a source. The plane of polarization of the light reflected by this mirror system back through the retarder is rotated by 90° so that it can pass through or be reflected by the beam splitter along the path of the output beam.

Whereas, reasonably efficient mirror systems have been designed for collection of light from a single source and forming it into a beam of light, it has been found that the distribution of the light within the beam is far from uniform.

Accordingly, it is another object of this invention to provide an efficient means of forming a beam of light from a single source in such manner that the distribution of the light within the beam is substantially uniform.

The manner in which the above objects, as well as other advantages of the system, are attained in accordance with the invention, will be more fully explained in connection with the drawings in which:

FIGS. 1, 2 and 3 illustrate different combinations of optical elements for combining beams derived from a plurality of light sources, and FIG. 4 illustrates an arrangement of optical elements that combines a plurality of light beams derived from a single source into a single beam in such manner that the distribution of the light within the beam is substantially uniform.

Reference is now made to the diagrammatic illustration of FIG. 1 wherein a spherical mirror 6, a light source 8, a collimating lens 10, a quarter wave light retarder 12, a polarizing beam splitter 14 and another polarizing beam splitter 16 are serially mounted in the order named along an optical axis 18. The polarizing reflecting surfaces 20 and 22 of the polarizing beam splitters 14 and 16 are in parallel planes so that vertically polarized light passing along the axis 18 passes through both surfaces to form an output beam in the direction of the arrow 24. Horizontally polarized components of the light are reflected at the surface 20 to a planar mirror 26 which reflects them back to the surface 20. The surface 20 reflects these components back along the axis 18 through the quarter wave plate 12. Upon emerging from the plate, the light is circularly polarized in one direction but after reflection by the mirror 6, it is circularly polarized in the opposite direction so that it emerges a second time from the right side of the plate 12 with a vertical polarization. This permits it to pass through the polarizing beam splitters 14 and 16 in the direction of the arrow 24, thereby augmenting the original output beam having a vertical polarization.

A spherical mirror 28, a light source 30, a collimating lens 32, a quarter wave retarder 34, a polarizing beam splitter 36 and a planar mirror 38 are mounted in the order named along an optical axis 40. Horizontally polarized components of the light striking a polarizing reflecting surface 42 of the beam splitter 36 are reflected to the polarizing reflecting surface 22 of the beam splitter 16 and thence along the direction of the arrow 24 to form part of the desired output beam.

Vertically polarized components of the light emitted by the source 30 travel along the axis 40 and pass through the polarizing reflecting surface 42 to the planar mirror 38 which reflects them back along the axis 40 through the quarter wave plate 34. The light emerging from the left side of the plate 34 is circularly polarized in one direction, but upon being reflected by the spherical mirror 28 it is circularly polarized in the opposite direction and emerges from the right side of the retarder 34 a second time with a horizontal polarization. It is then reflected by the polarizing reflecting surface 42 to the polarizing reflecting surface 22 and thence along the direction of the arrow 24.

In summation then, the vertically polarized components of light emanating from the source 8 pass along the axis 18 and emerge in a beam along the arrow 24. Horizontally polarized components of light emanating from the source 30 pass along the axis 40 and are reflected at the surfaces 42 and 22 so as to emerge in the beam along the path designated by the arrow 24. The horizontally polarized components of the light emanating from the source 8 and the vertically polarized components emanating from the source 30 are reflected back through their respective optical systems so that when they again reach the polarizing beam splitter they are directed into a beam along the path designated by the arrow 24.

It is essential that the plane of polarization of the light reflected back through each retarder be shifted by 90° after it has been reflected from the mirror associated with the respective source back through the retarder. This is achieved by using retarders having thicknesses equal to an odd number of quarter wave lengths and mirrors that reflect the light an odd number of times. When the mirrors are spherical as indicated at 6 and 28, there is only one reflection.

In FIG. 1, as well as in the other figures of the drawings, the letter P designates a port of a polarizing beam splitter through which light passes in either direction, whether it comes directly from a source, is reflected by a mirror, or is a combination of both. The letter W designates an output window of a polarizing beam splitter from which the desired beam, or at least a portion thereof, emerges.

Reference is now made to FIG. 2 wherein components that perform in a manner similar to that explained in connection with FIG. 1 are indicated by the same numerals. It will be noted that the polarizing beam splitters 16 and 36 and the planar mirror 38 of FIG. 1 have been eliminated and that the axis 40 for the components 28, 30, 32 and 34 has been rotated by 90°. With this arrangement, horizontally polarized components of light emerging from the source 30 are reflected by the surface 20 of the beam splitter 14 to form a beam in the direction of the arrow 24. The vertically polarized components from this source pass through the surface 20 to the planar mirror 26 which reflects them back through the retarder 34 and the lens 32 to the spherical mirror 28. After passing backwardly through the retarder 34 the light is circularly polarized in one direction and upon reflection by the mirror 28 the direction of the circular polarization is reversed so that the light is horizontally polarized after it has passed forwardly through the retarder 34 a second time. With such polarization it is reflected by the surface 20 so as to form part of the beam along the arrow 24.

FIG. 3 illustrates an optical arrangement which can combine beams produced by a large number of sources. Although the various components operate in a manner similar to that of components of FIGS. 2 and 3, they will be identified by different numerals for the sake of clarity. A spherical mirror 44, a source 46, a collimating lens 48, a light retarder 50 and polarizing beam splitters 52, 54 and 56 are mounted along an axis 58 in the order named. The beam splitters are similarly oriented so that their polarizing surfaces 60, 62 and 64 are in parallel planes. A spherical mirror 66, a light source 68, a collimating lens 70 and a light retarder 72 are mounted in the order named along an axis 74 that intersects the axis 58 at 90° and lies in the plane of the paper. A spherical mirror 78, a light source 80, a collimating lens 82 and a light retarder 84 are mounted in the order named along an extension of the axis 74, the spherical mirrors 66 and 78 being farthest away from the axis 58. Similar systems utilizing the light from other sources are indicated by numerals bearing single and double primes and it is apparent that other systems could be added.

The operation of FIG. 3 is as follows. Vertically polarized light from the source 46 passes along the axis 58 through the polarizing beam splitters 52, 54 and 56 to form part of a beam in the direction of the arrow 86. Horizontally polarized components from the source 46 are reflected at the surface 60 along the axis 74 toward the mirror 66. After passing through the retarder 72, being reflected by the mirror 66 and passing backwardly through the retarder 72, these components are vertically polarized so that they pass through the surface 60 along the axis 74 toward the mirror 78. When the light has passed through the retarder 84 to the mirror 78 and back through the retarder 84, its plane of polarization is horizontal so that it is now reflected along the axis 58 toward the polarizing beam splitter 54. Thus, both horizontally and vertically polarized components of the light from the source 46 are directed to the right along the axis 58.

Horizontally polarized components of the light from the source 68 are reflected at the surface 60 and after passing through the retarder 50 to the mirror 44 and back through the retarder 50, they are vertically polarized so as to pass through the surface 60 along the axis 58.

Vertically polarized components of light from the source 68 pass along the axis 74 through the surface 60 and the retarder 84 to the mirror 78. After reflection by the mirror 78 through the retarder 84, they are horizontally polarized so as to be reflected by the surface 60 to the right along the axis 58.

The horizontally and vertically polarized components of the light from the source 80 are similarly directed to the right along the axis 58.

The optical system indicated by the numerals with the single primes, and which is associated with the polarizing beam splitter 54, operates in a similar manner to direct light reaching its left side to the right along the axis 58. It can be seen that any number of systems, such as indicated by the double primed numerals can be added.

Reference is now made to FIG. 4 for a description of an optical system wherein a plurality of beams derived from the same source of light are superimposed. In this particular illustration, the source is indicated as being an arc defined between electrodes 90 and 92. A spherical mirror 94 is mounted with its center of curvature at the center of the arc. The electrodes 90 and 92 are shown in end view so that the arc therebetween is perpendicular to the paper and intersects the axis 96. Light emanating from the arc within a solid angle about an axis 98 is collected by a collimating lens 100 and directed into a beam that passes through a light retarder 101 and impinges on a mirror 102. A collimating lens 104 collects light from solid angle about an axis 106 and directs it along this axis through a quarter wave retarder 108 to a mirror 110. The mirrors 102 and 110 are mounted so that light reaching them along the respective axes 98 and 106 is reflected in opposite directions along an axis 112. A polarizing beam splitter 114 is oriented with its polarizing surface 116 at such an angle that vertically polarized light passes through it along the axis 112 and horizontally polarized light is reflected along the axis 96. A mirror 118 is mounted on the left surface of the beam splitter with its reflecting surface facing toward the right.

The operation of FIG. 4 is as follows. Light traveling along the axis 98 is reflected by the mirror 102 along the axis 112 to the polarizing surface 116 of the beam splitter 114. Horizontally polarized components traverse the following path—to the mirror 118, back to the surface 116, back along the axis 112 to the mirror 102, along the axis 98 through the quarter wave plate 101, through the lens 100 to the spherical mirror 94 which reflects them back along the axis 98 through the lens 100 and the retarder 101. Upon emerging from the retarder 101 they are vertically polarized so that, after reflection by the mirror 102 along the axis 112, they pass through the surface 116 to the mirror 110 from which they are reflected back along the axis 106. After passing backwardly through the quarter wave plate 108 to the mirror 94 and again forwardly through the plate, the light is once again horizontally polarized so that when it reaches the surface 116 via the mirror 110, it is reflected along the axis 96 in the direction of the arrow 120. Vertically polarized components of the light emanating from the source along the axis 98 pass through the surface 116 and are changed to a horizontal polarization in the same manner, so that they too are reflected by the surface 116 in the direction of the arrow 120.

Horizontally polarized components of light passing along the axis 106 are reflected by the mirror 110 to the surface 116 and thence in the direction of the arrow 120. Vertically polarized components of light passing along the axis 106 are reflected along the axis 112 by the mirror 110. They pass through the surface 116 and into the system 101–94 which changes them to a horizontal polarization as they again approach the surface 116 along the axis 112. They are directed from the system in the direction of the arrow 120 in the manner as the horizontally polarized components that originally passed from the arc 90–92 along the axis 98.

What is claimed is:

1. Apparatus for forming a beam of light comprising in combination:

a polarizing beam splitter having three ports and an output window;

means including at least one mirror for directing a first beam of light toward a first port;

means including at least one mirror for directing a second beam of light toward a second port;

a light retarder inserted in the path of each of said first and second beams of light;

each light retarder and an associated mirror comprising means for changing the plane of polarization of polarized light components returning from said polarizing beam splitter that passes through the retarder to the mirror and back through the retarder to said polarizing beam splitter; and means for returning light emerging from the third port back to said third port, whereby the unpolarized light of each of said first and second beams is combined by said polarizing beam splitter into a single unpolarized beam of light comprised of the initially orthogonally polarized components of each beam, said single beam emerging from said output window.

2. Apparatus as set forth in claim 1 wherein, said last mentioned means returns the light to said third port with the same plane of polarization it had when it emerged from said third port.

3. Apparatus as set forth in claim 1 wherein, said last mentioned means returns the light to said third port in a plane of polarization orthogonal to that which it had when it emerged from said third port.

4. Apparatus for combining three separate beams of light into a single beam of light comprising in combination:

a polarizing beam splitter having three ports and an output window;

three sources of unpolarized light;

a mirror system for directing beams of light from each of said sources to a different one of said ports;

a light retarder mounted in the path of each of said beams of light; and each light retarder in conjunction with the mirror system directing light through said retarder constituting means for changing the plane of polarization of polarized light whereby the unpolarized light from each of said three sources is combined by said polarizing beam splitter into a single unpolarized beam of light comprised of the initially orthogonal polarized components of each beam from said three sources, said single beam emerging from said output window.

References Cited
UNITED STATES PATENTS

| | | | |
|---|---|---|---|
| 2,449,287 | 9/1948 | Flood | 350—1' |
| 2,958,258 | 11/1960 | Kelly | 350—1' |
| 3,060,808 | 10/1962 | Koester | 350—1: |
| 3,401,593 | 9/1968 | Altman | 350—152 |

DAVID SCHONBERG, Primary Examiner

P. R. MILLER, Assistant Examiner

U.S. Cl. X.R.

350—152, 156, 169, 174